United States Patent [19]
Rowe

[11] Patent Number: 5,874,940
[45] Date of Patent: Feb. 23, 1999

[54] COMPENSATING STAR WHEEL HUB

[76] Inventor: David G. Rowe, 12901 Cedar St., Leawood, Kans. 66209

[21] Appl. No.: 903,482

[22] Filed: Jul. 30, 1997

Related U.S. Application Data

[63] Continuation-in-part of Ser. No. 716,023, Sep. 19, 1996.
[51] Int. Cl.⁶ .......................................................... G09G 5/00
[52] U.S. Cl. ........................... 345/156; 345/157; 345/184
[58] Field of Search ..................................... 345/156, 157, 345/163, 164, 167, 184

[56] References Cited

U.S. PATENT DOCUMENTS

| | | | |
|---|---|---|---|
| 5,442,377 | 8/1995 | Rowe | 345/165 |
| 5,479,190 | 12/1995 | Rowe | 345/156 |
| 5,493,314 | 2/1996 | Rowe | 345/156 |

*Primary Examiner*—Matthew Luu
*Attorney, Agent, or Firm*—Spencer Fane Britt & Browne LLP

[57] ABSTRACT

A flexible hub assembly for mounting of a carousal wheel is provided which maintains close contact between an annular array of spheres composing the loop mechanism of a continuous loop mouse or position control device, the flexible hub permitting the carousal wheel to move outwardly and the flexible hub pressing the carousal wheel inwardly in response to variations in size and shape of the spheres and in response to the presence of contamination on the spheres.

9 Claims, 6 Drawing Sheets

COMPENSATING STAR WHEEL HUB

This application is a continuation-in-part of co-pending application Ser. No. 08/716,023 filed on Sept. 19, 1996.

BACKGROUND OF THE INVENTION

This invention relates to improvements in a continuous loop mouse of the general type described in U.S. Pat. Nos. 5,442,377, 5,479,190 and 5,493,314 and which patents are incorporated herein by reference thereto. In particular, the present invention relates to an improved support cage or track and an indexing wheel with, and without x-axis movement detection, which reduce frictional forces to enable ease of loop movement and increased loop movement detection sensitivity.

The typical devices currently used for computer screen cursor or pointing control consist of mouse-type and trackball-type and joystick-type control devices. The mouse-type and trackball-type devices utilize an individual sphere which is supported on bearings to permit rotation of the sphere in any direction. The motion detection components are biased against the sphere to permit detection of sphere movement. The sphere movement is converted into X-axis and Y-axis components which are then utilized to reposition a pointing device or cursor on a computer screen or other graphical user interface device. Devices in which the sphere is enclosed in a housing so that the sphere travels in contact with a surface while the housing manipulated by a user are denominated as mouse-type devices. Devices in which the housing supports the sphere for direct manipulation by a user are generally referred to as trackball-type devices.

A third type of device has become prominent with laptop computers which consists of a "joystick" projecting from the center of the keyboard. The joystick is mobile about a central pivot axis. The joystick movement is converted into X-axis and Y-axis components which are then communicated to a pointing device or cursor on a computer screen or other graphical user interface to reposition the pointing device.

The problems associated with the first two devices—the mouse and the trackball—have been discussed in U.S. Pat. Nos. 5,442,377, 5,479,190 and 5,493,314. The problems associated with the joystick-type device are mainly related to the short range of motion, or short throw, presented by the small joystick which projects from the keyboard. The user must develop an ability to make very fine manipulations of the joystick or the user will constantly over-shoot the desired location when repositioning the pointer or the computer screen. The advantage of the joystick device is that the user does not have to lift the hands from the keyboard as with the mouse or the trackball.

The embodiments described in U.S. Pat. Nos. 5,442,377, 5,479,190 and 5,493,314 provide a useful alternative to the above devices and have the advantage of being located on the keyboard so the user does not have to lift the hands from the keyboard. In addition, these devices are superior to the joystick as a greater range of movement is available to the user so the problems associated with the joystick devices are not present.

However, in one embodiment of the type of inventions shown in U.S. Pat. Nos. 5,442,377, 5,479,190 and 5,493,314 —the annular array of multiple spheres embodiments—the movement of the spheres by the user requires that the spheres be pressed around two curves in order to provide the continuous loop aspect of the device. While operating as intended, the pushing of the spheres through the two curved portions of the housing results in frictional drag against the track sides and the side to side close contact between the spheres reduces the rolling ability of the spheres. These two attributes increase the amount of lateral force required from the user in order to manipulate the spheres into new positions.

Therefore, it will be appreciated that the need is present for an improvement to the annular array of multiple spheres which reduces this frictional inhibition to sphere movement at the curved sections of the housing and reduces the amount of lateral force which a user must provide in order to push the spheres through the two curved portions of the track. In addition the need is present to reduce the frictional resistance and reduce the needed user-provided lateral force in order to increase control of sphere movement and thereby increase sensitivity of the detection apparatus for the repositioning of a cursor laterally or in the direction of the X-axis.

SUMMARY OF THE INVENTION

The objectives of the present invention include providing a multi-axis cursor or pointer control device which operates from a fixed location thereby avoiding the need to move the control device location to effect signal generation and which contains the improvement of reducing friction between the sphere and the sides or walls of a guide-track during the movement of a sphere around the curved portions of the path of travel;

Another objective of the present invention is to reduce the amount of user applied lateral force need to operate the movement of an annular array of spheres through the curved portions of a path of travel in order to provide movement of the entire annular array of spheres.

Yet another objective of the present invention is to direct the user applied lateral force to a mechanism which assists in carrying the spheres through the curved portions of the path of travel and thereby reduces the frictional resistance resulting from adjacent spheres rotating against one another.

Another objective of the present invention is to provide a mechanism which serves to carry each sphere of the annular array through the arc of the curved portions of the path of travel in order to reduce the amount of user applied lateral force needed to operate the movement of an annular array of spheres through the curved portions of the path of travel in order to increase user control over sphere movement and increase detector sensitivity to sphere lateral movement.

Still another objective of the present invention is to direct the user applied lateral force into a carousel mechanism to serve to carry each sphere of the annular array through the arc of the curved portions of the path of travel in order to reduce the amount of user applied lateral force needed to operate the movement of an annular array of spheres through the curved portions of the path of travel in order to increase user control over sphere movement and increase detector sensitivity to sphere lateral movement.

Yet another object of the present invention is to provide a flexible, yet resistive mounting for a carousel mechanism which allows the carousel to respond to pressure variations on the carousel due to changes in the size and shape of the annular array of spheres and pressure variations from contaminants on the spheres to occupy within the invention.

Still another object of the present invention is to provide a flexible, yet resistive mounting for a carousel mechanism which resists pressures on the carousel from the annular array of spheres and provides a counter-force or pressure to the carousel mechanism to maintain the spheres of the annular array in close contact with adjacent spheres to eliminate play from the system and to provide a user with a highly responsive graphical user interface pointing device.

These objectives and advantages are obtained by an improvement in a position control device for a graphical user interface pointing device, the control device of the type having a plurality of spheres in a housing for supporting the spheres in adjacent annular array the housing having a window therein to permit a user to apply lateral force on, at least, on of the spheres for communication of the force to the plurality of spheres to accomplish lateral movement of the spheres, the improvement comprising a carousel wheel rotatable about a central axis the wheel having sphere-accepting indents to receive a sphere forced by a user against the wheel orthogonally to the wheel central axis, the indents receiving and communicating the user-applied force from the sphere to the axis to rotate the wheel to direct the movement of the indent-received sphere through the arc of a curve defined by the rotation of the wheel on the axis and to deposit the sphere at an opposite end of the arc from where the sphere was received by the indent, and an apron extending outwardly from the wheel central axis to support the sphere received by the wheel indent, the apron to receive and support the sphere during the movement of the sphere by the wheel, a sphere-directing rail for defining a generally elliptical path of sphere travel to direct the sphere travel toward a first carousel wheel positioned at a first curve of the elliptical path for travel of the sphere through an arc defined by the rotation of the first wheel and the rail to then receive the arc-traveled sphere and to direct the received-sphere toward a second carousal wheel positioned at a second curve of the elliptical path for travel of the sphere through an arc defined by the rotation of the second wheel. In this improved device the sphere-directing rail can comprise a first rail spaced outwardly from a second rail for containing the sphere therebetween to direct the path of sphere travel.

Further, these objectives and advantages are obtained by an improvement in a position control device as above-described in which a flexible hub is provided for connection of the carousel wheel to the axis to allow the carousel wheel or mechanism to reposition in response to pressure exerted on the carousel wheel by the sphere array and the flexible hub further providing a resistive force to the carousel wheel to maintain the spheres of the array in close contact with the adjacent spheres of the array to eliminate play from the array.

The foregoing and other objects are not meant in a limiting sense, and will be readily evident upon a study of the following specification and accompanying drawings comprising a part thereof. Other objects and advantages of this invention will become apparent from the following description taken in connection with the accompanying drawings, wherein is set forth by way of illustration and example, an embodiment of this invention.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DETAILED DESCRIPTION OF THE PREFERRED EMBODIMENTS

Figure 1:
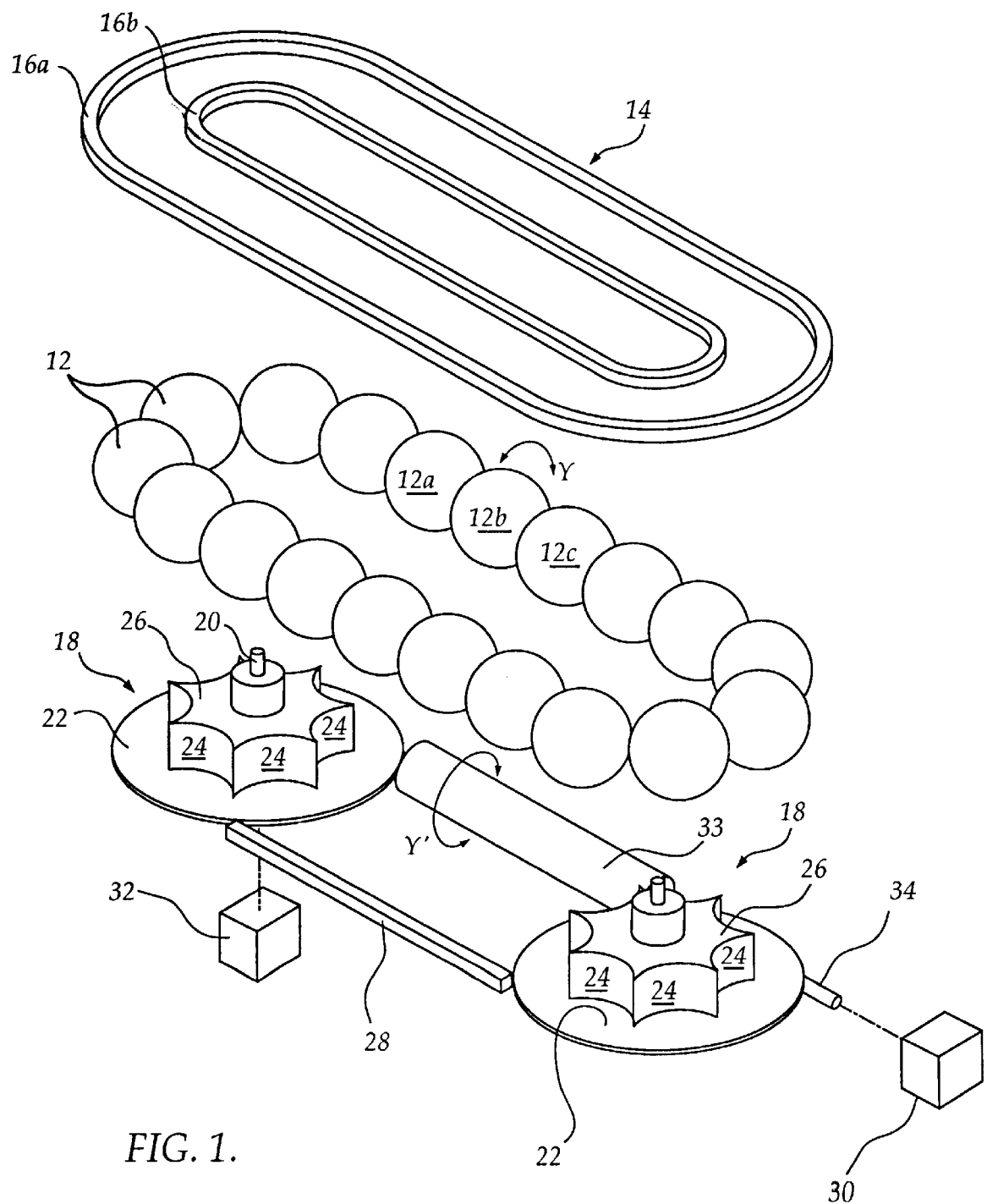
FIG. 1 is an exploded perspective view of the invention showing the interrelationship between the movable spheres, the guide cage, and the carousel wheels.
Figure 2:
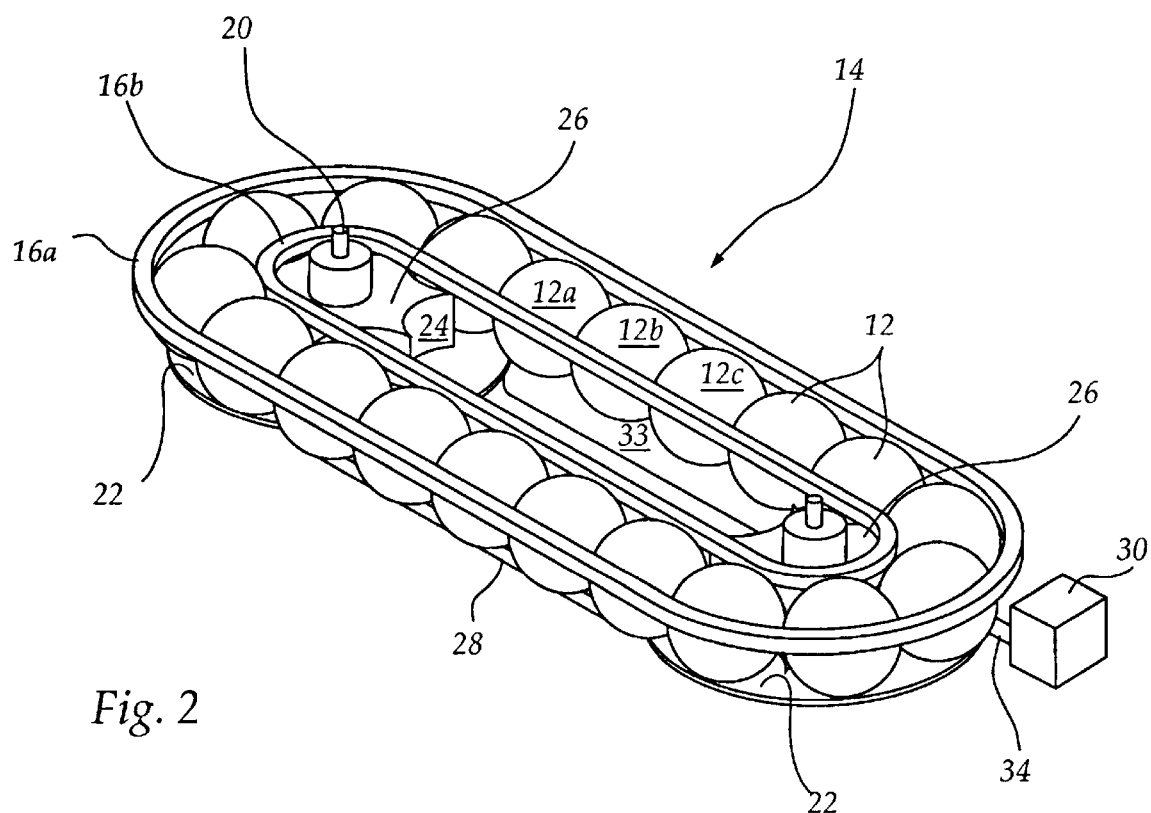
FIG. 2 is a top and right side perspective view of the invention showing the components of FIG. 1 in assembled array.

Referring first to FIG. 2 the assembled improved continuous loop mouse or circulating-element mouse is shown. The relationship of the component parts is better realized by reference to FIG. I which is an exploded view of FIG. 2. In FIG. 1, multiple spheres or balls 12*a*, 12*b*, 12*c* are shown in side-to-side array to form a continuous annular loop. Spheres 12 are contained within cage or track or guide 14 which is composed of inner guide 16*b* and outer guide 16*a*.

The bottom support or floor of track or cage 14 is formed by different components at different locations along the path traveled by spheres 12. At either of the curved portions of cage 14, bottom support is provided by apron 22 of carousel 18. In the straight portions of cage 14 spheres 12 are supported by guide 28 and motion take-off 33. In this manner spheres 12 are fully supported at all locations within cage or guide 14.

As more fully described in U.S. Pat. Nos. 5,442,377, 5,479,190 and 5,493,314, the environment of the present inventive improvement is to operate to move a pointing device on display screens such as a cathode ray tube (CRT) or other graphical user is interface (GUI). This is accomplished by movement of spheres 12 in two directions to affect two sensors or detectors 30, 32. One detector 30 is devoted to movement in the Y-axis or the horizontal plane and the other detector 32 is dedicated to movement in the X-axis or the vertical plane. These detectors operate to sense different movements of spheres 12 in these two directions and communicate this movement to produce a corresponding change in the position of a pointer on a computer display screen or other user interface.

The motion to be detected and communicated to the pointer is produced by a user pushing spheres 12 in one of several directions. In order to achieve vertical pointer movement any of spheres 12a, 12b or 12c are rotated in the directions of Arrow Y which results in rotation of motion take-off 33 in the directions indicated by Arrow Y'. This rotational movement is then communicated to detector 30 by connecting rod 34. The rotational motion is sensed by detector 30 and then, by operations well understood in the art, the rotational movement produces a corresponding movement in the vertical location of a pointer on a computer CRT or the pointer location on some other type of device.

In U.S. Pat. Nos. 5,442,377, 5,479,190 and 5,493,314 embodiments of the inventive concept were shown therein utilizing an annular array of spheres which operated within an enclosed track. More particularly, spheres 12 are adjacent one another and user lateral pressure applied to one such sphere is communicated to all spheres within the annular ring of spheres. The user applied lateral pressure must be sufficient to overcome the impacts between spheres and the frictional contact of the spheres with the sidewalls of the housing. The passage of the spheres around the curves of the housing and the impacts of the spheres with one another present interfering frictional resistance to smooth passage of the spheres around the path of travel. The present inventive improvement to this embodiment provides for greater freedom of sphere movement, requires less force to be applied by a user and permits greater user fine control to directing the repositioning of a pointer as the lateral movement of the spheres is more easily controlled. The manner by which this improved embodiment is accomplished is described hereinafter.

Referring now to FIG. 1, the components which comprise the improved device are shown in exploded view. An annular array of spheres 12 is arranged such that the spheres are adjacent one another and each spheres is in contact, generally, with the adjacent spheres 12a, 12b, 12c. This enables the entire array of spheres to be laterally moved in an elliptical path by a user pressing against and moving any one of spheres 12 laterally. The improved housing which guides the travel of the spheres 12 is shown in FIG. 1. positioned above spheres 12 and track or cage 14 is comprised of inner guide or track 16b and outer track or guide 16a.

Referring to FIG. 2, the positioning of track or guide 14 with respect to spheres 12 is shown. It can be seen in FIG. 2 that inner guide or track 16b is positioned to the interior of the spheres 12 and track 16a is positioned to contain the outside edge of spheres 12 and to maintain spheres 12 between the space presented by tracks 16a, 16b. In this fashion spheres 12 are directed along the path established by track or guide 14 and the spheres are communicated from a first curve of the elliptical path to a second curved portion in the elliptical path established by track or guide 14.

Referring again to FIG. 1, the components which direct spheres 12 through the are of the first and second curves of the elliptical path are shown positioned below the annular array of spheres 12. Carousel wheel 18 is positioned at the curve of the elliptical path and generally operates to receive each sphere 12 and to receive the user-applied force to the annular array of spheres 12 and to communicate that force to central wheel axis 20 about which carousel 18 rotates to then carry each sphere 12 through the are defined by the rotation of carousel 18 and to then deposit each sphere 12 at the opposite end of the are from where each sphere 12 entered carousel 18. This mechanism will be described in greater detail herein after.

Figure 3:
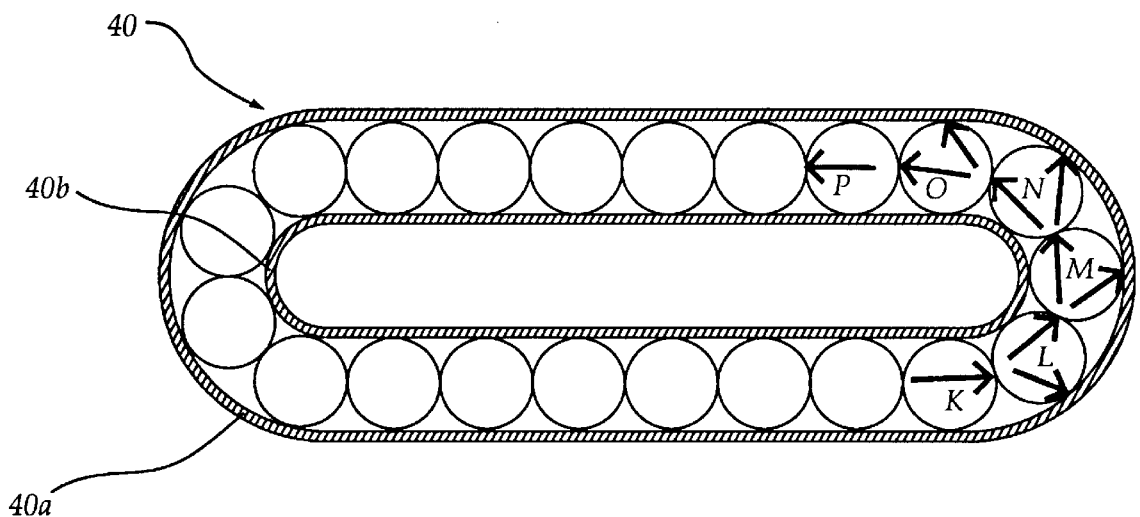
FIG. 3 is a top plan view of the invention showing the force vectors which are generated by the spheres as they are pushed about within a housing.
Figure 4:
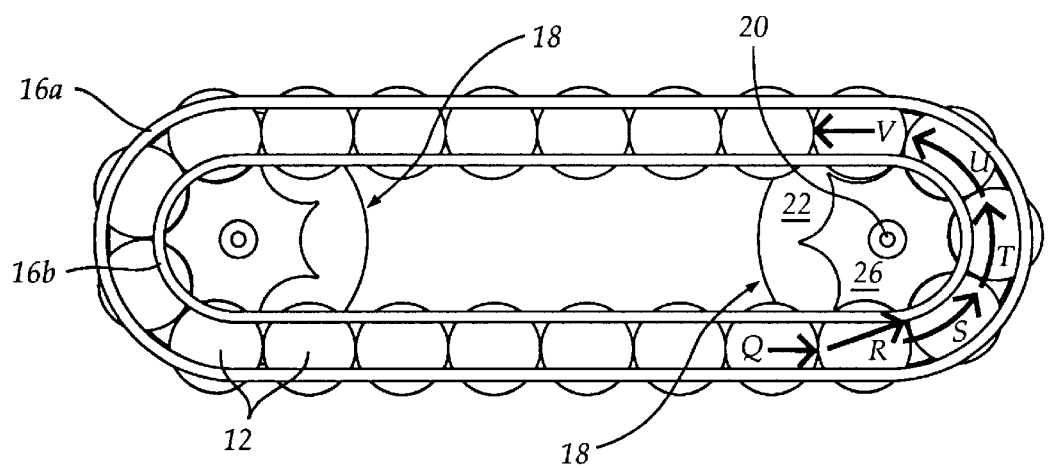
FIG. 4 is a top plan view of the invention showing the modified force vectors which are generated by the spheres as they are pushed about within the guide cage and with the star wheel assembly present.

Referring now to FIGS. 3 and 4 the forces operating during the lateral movement of spheres 12 will be discussed. In FIG. 3 an annular array of spheres is shown within a housing 40, but without any assisting mechanism to enable the spheres to negotiate the two curves present in the elliptical path. As the spheres are pressed laterally in the direction of Arrow K, the sphere enters the curved portion of the elliptical path and the force designated by Arrow K becomes divided into two components as shown by the arrows within sphere L. It can be seen that the force component which is derived from user applied lateral force begins to press into two directions, at least, with a first component being directed against outer wall 40a and the second component of force being directed toward sphere M which is positioned ahead of sphere L in the direction of travel. In like fashion, the forces on sphere M also are directed in two components, an outward component directed against wall 40a and a component directed against sphere N. This division of force continues throughout the path of travel around the curve until the path of travel of the sphere is again in a straight line as represented by sphere P. It is this division of the applied force into different directions which increases the frictional resistance as the spheres travel around the curve and which increases the amount of force required to be applied by a user and which reduces the degree of control which a user has over the movement of spheres 12.

Referring now to FIG. 4, the improved device which overcomes the previously described problems will be discussed. In FIG. 4, carousel wheel 18 is shown in position at the curve of the elliptical path of travel. Carousel wheel 18 is comprised of shoulder 26 and apron 22 both of which act to receive a sphere 12 as it enters the curve of the path of travel and serve to support each sphere and direct the applied force into rotational movement about axis 20 to then carry each sphere 12 on carousel 18 through an arc defined by the path of wheel 18 as it rotates about axis 20.

As a sphere Q enters the curved portion of the path the force is directed in a forward direction. As the sphere advances to the position indicated by sphere R, the force is applied to the projecting portion or leading edge of indent 24 (FIG. 1) and that force is communicated through shoulder 26 of carousel 18 and rotates carousel wheel 18 about axis 20. The communicated force serves to rotate carousel wheel 18 and to carry sphere R through successive positions S, T, U and to deposit the sphere at position V in the straight portion of the elliptical path. As indicated in FIG. 4, the user-applied forces first encountered by wheel 18 are in the direction shown by the arrow on sphere Q and then at sphere R the forces are accepted by indent 24 on shoulder 26 and cause wheel 1 8 to rotate in the direction of Arrow A about axis 20.

Referring now to FIG. 1, the configuration of carousel wheel 18 will be described detail. Carousel wheel 18 has shoulder 26 which extends from and rotates about a central axis 20. The outer circumference of shoulder 26 is provided with indents 24 which in one embodiment are curved to receive a sphere 12 into the depression of indent 24. The projecting edges of indents 24 accept the user-applied forces from spheres 12 as the spheres are received into indent 24. This force is then passed on by shoulder 26 to cause rotation of wheel 18 about axis 20. Apron 22 extends outwardly from shoulder 26 to extend under and support sphere 12 as it enters indent 24 of shoulder 26. Apron 22 assists in the reduction of frictional forces by supporting and carrying sphere 12 in conjunction with shoulder 26 and guide 14 along the path of the arc defined by the rotation of wheel 18.

In FIG. 1, it is shown that one such wheel 18 is connected to detector 32 which senses the direction and amount of rotation of wheel 18 and converts that information into a signal for communication to a pointing device for repositioning of the pointing device along the X-axis of the CRT or other interface device. In the manner as previously described in U.S. Pat. Nos. 5,442,377, 5,479,190 and 5,493,314 the rotation of any of spheres 12a, 12b, or 12c in the direction of Arrow Y causes rotation of take-off 33 in the directions indicated by Arrow Y'. This rotation is communicated to detector 30 by shaft 34 to permit detector 30 to sense the direction and amount of rotation of take-off 33. This information is then converted into a signal for communication to a pointing device for repositioning of the pointing device along the Y-axis of the interface device.

Figure 5A:
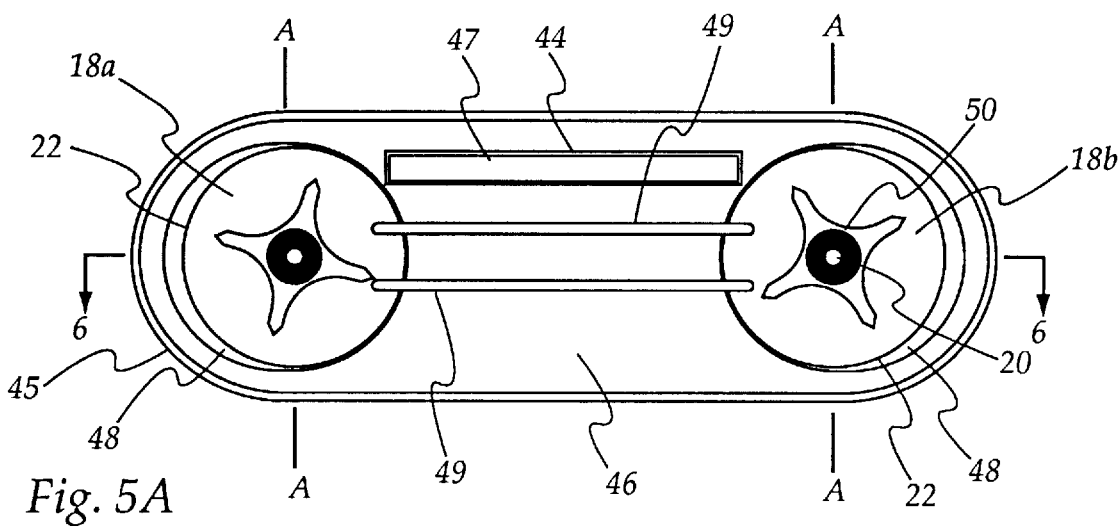
FIG. 5A is a top plan view of an embodiment of the invention showing an exterior case to hold the spheres with the star wheel assemblies inserted through voids or depressions in the floor of the case and showing the star wheel assemblies having a pressure providing, flexible, central hub contacting the rotational axis with the flexible hub in the relaxed or unloaded position.

Referring to FIG. 5A, the various components of an alternative embodiment are shown which rely upon a flexible hub and movable star wheel assembly to maintain contact of the star wheels against the spheres and to maintain the spheres in close contact with one another. In addition, this flexible hub embodiment eliminates excess space or "play" between spheres 12a, 12b, and 12c (FIG. 5B); permits compensation for variations in sphere size and sphere deformities; maintains pressure against the spheres; and maintains contact between the spheres when the system is contaminated by extraneous material such as dust, food or other crud.

Figure 5B:
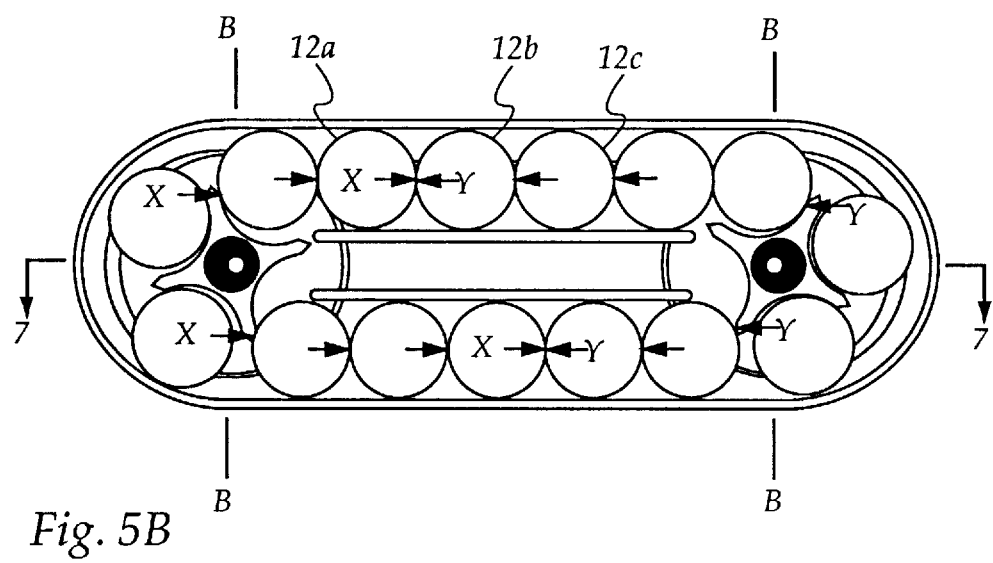
FIG. 5B is a top plan view of the embodiment of the invention shown in FIG. 5A and showing spheres loaded into the case and the star wheels pressed outwardly by the spheres and the flexible hub compressed between the axis and against the inside portion of the star wheel, and showing the flexible hub resisting the outward pressure of the spheres and providing responsive pressure to the star wheel and against the spheres in the direction of arrows X and Y.

In the embodiment of FIG. 5A a sphere retaining case or holder 45 surrounds the area in which the spheres are to be retained. Case 45 has a floor 46 which supports the spheres as they move about case 45 in a generally elliptical pattern. Case 45 is subdivided by two centrally positioned rails 49. Rails 49 retain spheres 12 in rows on either side of case 45 and separate the sphere rows into two groups (FIG. 5B). Spheres 12 on a first side of case 45 travel in a first direction as lateral force is applied by a user to spheres 12 and the spheres on the second side of case 45 travel in the opposite direction in response t o the same lateral force.

Referring again to FIG. 5A, extending through void 44 in case floor 46 is Y—axis take-off roller 47 which rotates in response to user applied rotational motion in the direction of Arrow Y (FIG. 1) on spheres 12 which are in contact with roller 47. This rotation is measured and determined as previously described herein and results in the corresponding movement of a cursor on a graphical user interface (GUI).

Still referring to FIG. 5A, case floor 46 has two voids, or depressions, 48 therein which allow for the insertion of carousal wheel or star wheel 18a, 18b into case floor 46. Star wheels 18 have apron 22 thereon which is intended to be at the same level as case floor 46. The void or depression 48 in floor 46 permits alignment of apron 22 with case floor 46 so that apron 22 and case floor 46 are generally coplanar. In this manner as spheres 12a, 12b, 12c (FIG. 5B) travel along case floor 46 between star wheels 18 there is no disruption of movement of the spheres due to a change in height in case floor 46 and apron 22. Void 48 in case floor 46 is slightly larger than the diameter of apron 22 of star wheel 18. The slightly larger diameter allows for movement of star wheel 18 and apron 22 in response to increases and decreases in the amount of space required by spheres 12. Depression or void 48 allows for such movement of apron 22 within void 48 and without apron 22 contacting and binding on case floor 46. The need for the movement of apron 22 in void 48 will be described hereinafter.

Figure 6:
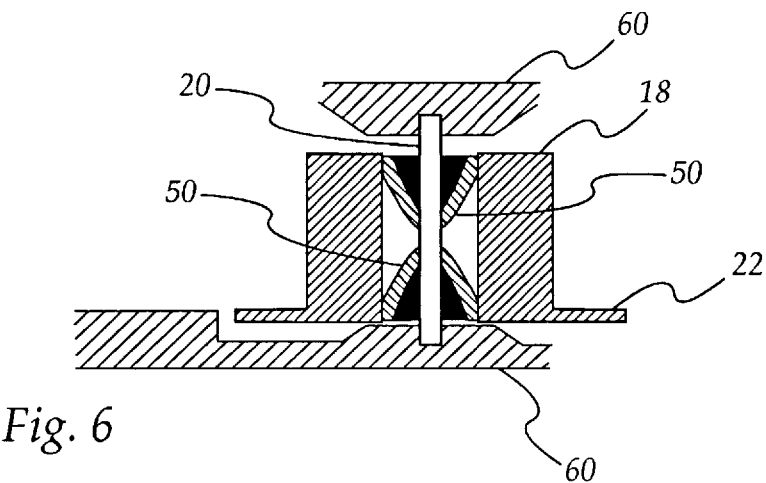
FIG. 6 is a fragmentary cross-sectional elevational view of the star wheel and axis and flexible hub taken along line 6—6 of FIG. 5A and showing the assembly in a relaxed or unloaded position.
Figure 8:
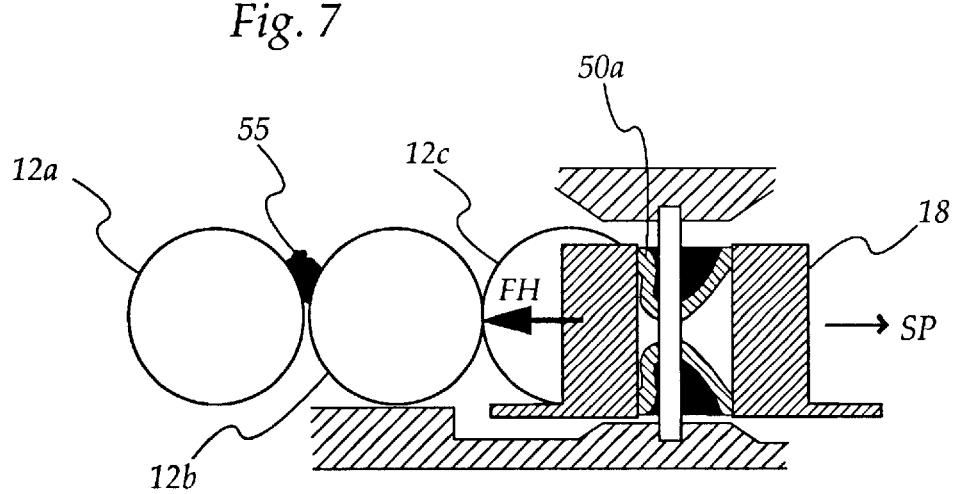
FIG. 8 is a fragmentary cross-sectional elevational view of the star wheel and axis and flexible hub taken along line 8—8 of FIG. 5C and showing the assembly having spheres loaded therein and pressing against the axis in an outward direction and additional pressure being presented by contamination between two of the spheres and the flexible hub being compressed and resisting the outward pressure to press the star wheel against the spheres.

Referring now to FIG. 6, the combination of components contributing to the operation of flexible star wheels 18a, 18b will be described. In FIG. 6 a fragmentary cross-sectional view of star wheel 18 of FIG. 5A is presented without any spheres contacting the star wheel and putting pressure on the star wheel. In FIG. 6 star wheel 18 is mounted on central axis 20 and centered on axis 20 by two flexible hubs 50. Flexible hubs 50 serve to maintain star wheels 18a, 18b moveably mounted on axis 20. Axis 20 is held in place by axis supports 60 on either end of axis 20. Axis supports 60 permit axis 20 to rotate thereon. As will be described hereinafter the mounting of carousels or star wheels 18a, 18b on flexible hubs 50 allows the inventive mouse or pointer to be responsive to variations in pressure on star wheels 18a, 18b caused by the insertion of spheres 12a, 12b, 12c (FIG. 5B) into the case 45 and in-between star wheels 18a, 18b; responsive to variations in sphere size and shape; and responsive to the entry of contaminants into the system between spheres 12a, 12b, 12c (FIG. 8).

Still referring to FIG. 6, flexible hub 50 operates to allow star wheels 18 to flex or move outwardly in response to the above-described received pressures and operates to press star wheels 18a, 18b against spheres 12a, 12b, 12c (FIG. 5C) in order to maintain close contact between the spheres and to reduce or eliminate play or slack in the system and to provide a user with immediate responsiveness of the system to user applied forces for redirection of a cursor on a graphical user interface.

Figure 7:
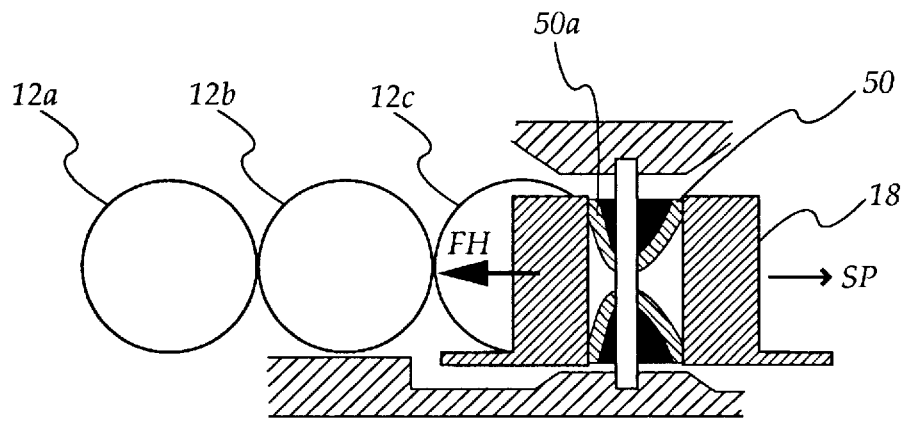
FIG. 7 is a fragmentary cross-sectional elevational view of the star wheel and axis and flexible hub taken along line 7—7 of FIG. 5B and showing the assembly having spheres loaded therein and slightly pressing against the axis in an outward direction and the flexible hub resisting the outward pressure to press the star wheel against the spheres.

Referring now to FIG. 7, the interrelation of star wheels 18, flexible hub 50 and axis 20 components is shown and in the position encountered when spheres 12a, 12b, 12c (FIG. 5B) are loaded into case 45. As is shown in FIG. 5B, spheres 12 are loaded into case 45 and the size of spheres 12 tends to require slightly more space than is available between star wheels 18a and 18b of FIG. 5A. This space demand of spheres 12 (FIG. 5B) causes star wheels 18a, 18b to be pressed outwardly, and away from each other. This effect is shown in FIG. 7 wherein star wheel 18 and apron 22 have become pushed outwardly of axis 20 in the direction of Arrow SP due to the insertion of spheres 12 into case 46. This shift results in an increase of space in void 48 at area 48a. While the position of axis 20 is unchanged with respect to its original position against axis support 60 as shown in FIG. 6, flexible hub 50 has been compressed by the outward shift of star wheel 18 and apron 22. The compression of flexible hub 50 serves to press star wheel 18 and apron 22 inwardly, in the direction of Arrow FH, and toward spheres 12 by the resistance provided by flexible hub 50 compression.

As spheres 12 push against star wheel 18 and force star wheel 18 outwardly flexible hub 50, specifically at area 50a, becomes compressed and tends to resist further movement of star wheel 18 in the outward direction. This resistance provided by flexible hub 50 tends to continuously press star wheel inwardly and in opposition to the force caused by spheres 12*a*, 12*b*, 12*c* (FIG. 5B). Flexible hub 50 thereby provides a force which is opposite to that of the pressure exerted by spheres 12 and tends to maintain the spheres in a compact and in-contact array.

Referring now to FIG. 8, the situation is shown in which contamination by food or dust or other matter or crud 55 has entered the system and has become attached to one of spheres 12 or lodged in-between two of spheres 12. In such a case the amount of space required by spheres 12*a*, 12*b*, 12*c* (FIG. 5B) is increased and the pressure exerted (Arrow SP) by the spheres on star wheels 18*a*, 18*b* also is increased. In this situation it can be seen that flexible hub portion 50a is even further compressed between star wheel 18 and axis 20 as compared to FIG. 7 and that separation between floor 46 and apron 22 at void area 48*a* is increased. Flexible hub 50 responds to this increased requirement for space between star wheels 18*a*, 18*b* by compressing and yet continues to provide the desired sphere-to-sphere contact by opposing this outward pressure and pressing star wheel 18 back toward spheres 12.

Figure 5C:
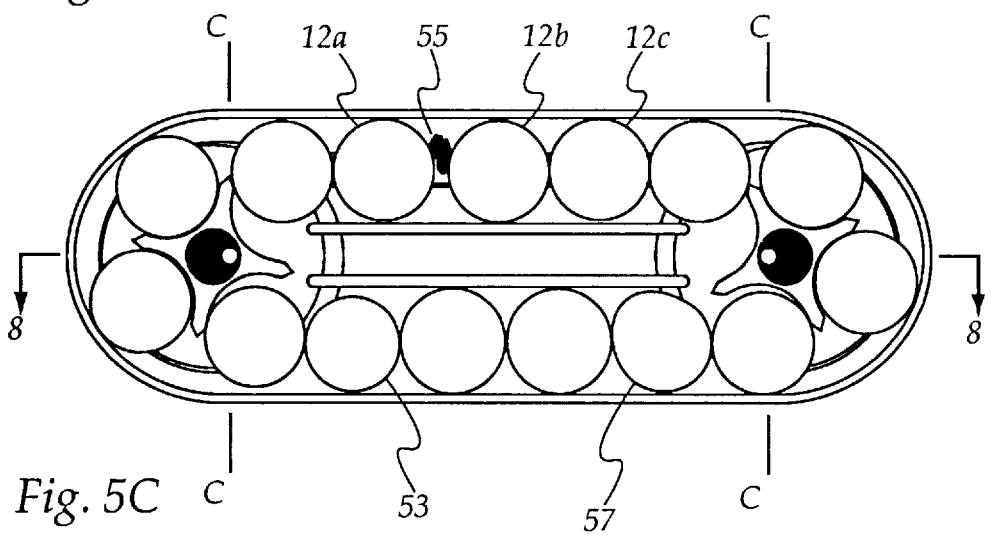
FIG. 5C is a top plan view of the embodiment of the invention shown in FIGS. 5A and 5B showing the star wheels under variable outward pressure due the pressure of the spheres loaded into the case and due to variously sized spheres in the case and due to contaminants on the spheres and showing the flexible hub providing variable resistive pressure in the direction of arrows X and Y to the star wheels to counteract the received outward pressure of the spheres.

Flexible hub 50 is composed of rubber or other elastomeric material which provides rebound pressure (in the direction of Arrow FH) as the compression exerted on it increases (in the direction of Arrow SP) It will be appreciated by those skilled in the art that flexible hub 50, once compressed, is able to rebound and to immediately readjust the location of star wheel 18 to a more inward position should contamination 55 be removed or fall off the sphere to which it is attached thus decreasing the need for space by spheres 12*a*, 12*b*, 12*c* (FIG. 5C).

Figure 9:
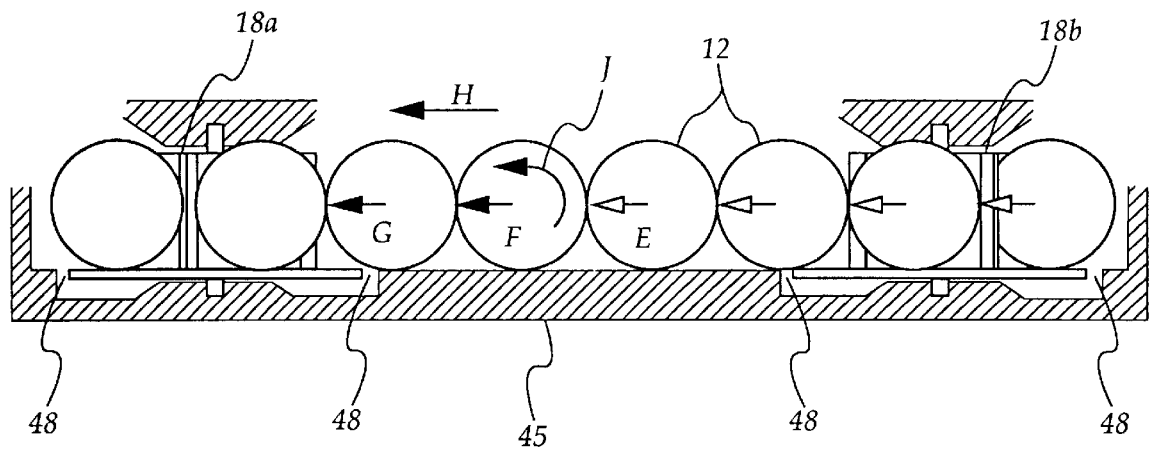
FIG. 9 is a cross-sectional elevational view of the star wheels with spheres in place there between taken along line 7—7 of FIG. 5B and with the X-axis rotational take-off removed for clarity and showing the direction and application of various forces applied to the spheres by the user and the star wheels.

Referring now to FIG. 9, the general operation of flexible hub 50 will be discussed with respect to FIGS. 5A, 5B and 5C. In FIG. 9 star wheels 18*a*, 18*b* are shown in the position they would occupy when mounted within cage 45. For the purpose of FIG. 9 cage 45 is shown in fragmentary fashion and Y-axis take-off 47 has been eliminated. It may be seen in FIG. 9 that spheres 12 fill the space between star wheels 18*a*, 18*b* and that the spheres are in contact with one another. It is generally desirable to maintain sphere-to-sphere contact in order that movements of the spheres, which are instituted by the user, are immediately communicated from one sphere to the next, and the user finds very little slack or play within the system and has a sense that minor user movement of the spheres will cause an immediate displacement of the cursor on the graphical user interface to which the invention is in communication.

Still referring to FIG. 9, the various forces and pressures which are exerted on star wheels 18*a*, 18*b* flexible hubs 50 and spheres 12 will be discussed. It will appreciated from the foregoing discussion that flexible hubs 50 (FIG. 8) are responsive to the outward pressure caused by the insertion of spheres 12 between star wheels 18*a*, 18*b* and that in turn star wheels 18*a*, 18*b* =1 are provided with a resistive or inward pressure by flexible hubs 50 on spheres 12 so that sphere-to-sphere contact is maintained. In operation, a user will apply lateral and rotational forces onto one of the spheres which is exposed to user manipulation through a user access void in the top of case 45. The user access void has not been shown in these figures, however, a typical access void is shown in U.S. Pat. No. 5,493,314 and 5,479,190 and 5,442, 377 and the teachings of these patents are incorporated herein by reference.

One such user lateral force will be in the direction of Arrow J (FIG. 8). As the user presses on sphere F and causes it to rotate in the direction of Arrow J, spheres F and G are pushed in the direction of Arrow H. This sudden movement will tend to cause a gap to open between spheres F and E. However, with the present invention, this gap is immediately closed as a result of the inward pressure of flexible hub 50 on star wheel 18*b*. Therefore, as sphere F is moved in the direction of Arrow H any gap or opening created between sphere F and sphere E is immediately eliminated as the force generated by flexible hub 50 will tend to push star wheel 18*b* in the direction of Arrow H and will push spheres between wheel 18*b* and sphere F in the direction of Arrow H to fill the space created by the user movement of sphere F. In this manner spheres 12 are maintained in sphere-to-sphere contact and the user is provided with a tight and responsive feel of the mouse.

In FIG. 9 the various forces provided by the user as well as the forces generated by flexible hub 50 on star wheel 18*a*, 18*b* are represented by the shaded and unshaded arrows within the spheres. The unshaded arrows indicate forces being contributed by the inward pressure of flexible hub 50 on star wheel 18*b* against spheres 12. The darkened arrows indicate the lateral force being contributed to the system by a user as sphere F is rotated in the direction of Arrow J in order to move all of spheres 12 in the direction Arrow H. It will be appreciated by those skilled in the art that an inward pressure is also being wheel 18*a*, war wheel 18*a* of FIG. 9. The inward pressure of star wheel 18*a*, which is generated by flexible hub 50 on star wheel 18*a*, is opposite in direction to the unshaded arrows shown in FIG. 9 used to express the forces applied by star wheel 18*b*. The pressure generated by flexible hub 50 of star wheel 18*a* is generally equal to that of the pressure generated by star wheel 18*b*.

These pressures contributed by various components of the system are also shown in FIGS. 5A, 5B and 5C where a plan view of the inventive graphical user interface is shown. As previously discussed, FIG. 5A shows the invention without spheres loaded therein and star wheels 18*a*, 18*b* in their relaxed position and centered within voids 48 of case floor 46. In FIG. 5B, spheres 12, loaded into case 45, are receiving inward pressures from each of star wheels 18*a*, 18*b*. These pressures are indicated by a series of arrows denominated as Arrows X and Arrows Y. Arrows X indicate the forces generated by flexible hub 50 on star wheel 18*a* and Arrows Y indicate the forces generated by flexible hub 50 on star wheel 18*b*. These arrows show the direction of the opposing forces being generated by star wheels 18*a*, 18*b* in order to maintain spheres 12 in contact throughout the entire system.

Referring now to FIG. 5C, the instance is shown in which spheres of different shapes and sizes are placed between star wheels 18*a*, 18*b*. Also shown is the situation in which contaminates have entered the system. Those skilled in the art will appreciate that star wheels 18*a*, 18*b* are able to move inwardly and outwardly on flexible hubs 50 and therefore can expand and contract the total distance between star wheel 18*a* and star wheel 18*b* to account for size changes in any of spheres 12. Such size changes can be caused by a variety of factors such as changes in temperature, changes in sphere moisture content, and simple differences in sizing of the spheres during manufacture.

As shown in FIG. 5C, an undersized sphere 53 is in the system and between two standard sized spheres. In this case flexible hubs 50 on star wheels 18*a*, 18*b* press the star wheels further inward to take up the space which is not occupied by the undersized sphere 53. Once undersized sphere 53 is actually on one of star wheels 18*a*, 18*b* the star wheels will be pressed outwardly as undersized sphere 53 is no longer reducing the space between star wheel 18*a* and star wheel 18*b*.

Also shown in FIG. 5C, is a contaminant 55 which has entered the inventive mouse system. When a contaminant 55 is within the system of spheres 12 it is likely to alternately catch onto and fall off of a sphere. The flexible hubs 50 allow for this occurrence and respond to increase the available space between star wheels 18a, 18b if the contaminant is on a sphere 12. When the system is cleaned, or contaminant 55 falls off the sphere, flexible hubs 50 operate to decrease the space available for spheres 12 by moving star wheels 18a, 18b closer together.

Also shown in FIG. 5C is the case in which the system contains a deformed sphere 57. Such deformation may be due to poor manufacturing of the spheres of due to mishandling of the device. When such an out of round sphere 57 is present, flexible hubs 50 constantly operate to immediately expand or contract the space available to spheres 12 in order to maintain contact between the spheres as the diameter of sphere 57 at the point of contact with adjoining spheres varies during sphere movement.

It will be appreciated by those skilled in the art that the division of the star wheel, flexible hub and axis into three distinct components is not a necessary feature for achieving the intended operation of the flexible hub. These components, while presented as a combination of components, could be formed as a single or unitary flexible plastic unit without departing from the scope of this invention. A formed plastic connection piece between a formed axis and formed star wheel could provide sufficient flexibility and rebound characteristics to maintain the star wheel contact with the sphere array and compensate for expansion and contraction of the sphere array.

In the foregoing description, certain terms have been used for brevity, clearness and understanding, but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the improved continuous loop mouse or circulating-element mouse is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed as new and desired to secured by letters patent is as follows:

1. An improvement in a position control device for a graphical user interface pointing device, the control device of the type having a plurality of spheres in a housing for supporting the spheres in adjacent annular array, the housing having a window therein to permit a user to apply lateral force on at least one of the spheres for communication of the force to the plurality of spheres to accomplish lateral movement of the spheres the improvement comprising:

a carousel wheel rotatable about a central axis said wheel having sphere-accepting indents to receive a sphere forced by a user against said wheel orthogonally to said wheel central axis, said indents receiving and communicating said user force from said sphere to said wheel to rotate said wheel about said axis to direct the movement of said indent-received sphere about the arc of a curve defined by the rotation of said wheel on said axis and to deposit said sphere at an opposite end of said arc from where said sphere was received by said indent, and a flexible hub connecting said carousel wheel to said axis, said flexible hub permitting repositioning of said carousel wheel in response to variations in forces on said carousel from the array of spheres.

2. The device as claimed in claim 1, further comprising an apron extending outwardly from said wheel central axis to support said sphere received by said wheel indent, said apron to receive and support said sphere during the movement of said sphere by said wheel.

3. The device as claimed in claim 1 further comprising a sphere-directing rail for defining a generally elliptical path of sphere travel to direct said sphere travel toward a first carousel wheel positioned at a first curve of said elliptical path for travel of said sphere through an arc defined by the rotation of said first wheel and said rail to then receive said arc-traveled sphere and to direct said received sphere toward a second carousel wheel positioned at a second curve of said elliptical path for travel of said sphere through an arc defined by the rotation of said second wheel.

4. The improved device as claimed in claim 3 wherein said sphere-directing rail comprises a first rail space outwardly from a second rail for containing said sphere there between to direct the path of sphere travel.

5. An improvement in a position control device for a graphical user interface pointing device, the control device of the type having a plurality of spheres in a housing for supporting the spheres in adjacent annular array the housing having a window therein to permit a user to apply lateral force on at least on of the spheres for communication of the force to the plurality of spheres to accomplish lateral movement of the spheres the improvement comprising:

a carousel wheel rotatable about a central axis, said wheel having sphere-accepting indents to receive a sphere forced by a user against said wheel orthogonally to said wheel central axis, said indents receiving and communicating said user force from said sphere to said wheel to rotate said wheel about said axis to direct the movement of said indent-received sphere about the arc of a curve defined by the rotation of said wheel on said axis and to deposit said sphere at an opposite end of said arc from where said sphere was received by said indent, an apron extending outwardly from said wheel central axis, said apron to receive and support said indent-received sphere during the movement of said sphere by said wheel, and a flexible hub connecting said carousel wheel to said axis, said flexible hub permitting repositioning of said carousel wheel in response to variations in forces on said carousel from the array of spheres.

6. The device as claim 5 further comprising a sphere-directing rail for defining a generally elliptical path of sphere travel to direct said sphere travel toward a first carousel wheel positioned at a first curve of said elliptical path for travel of said sphere through an arc defined by the rotation of said first wheel and said rail to then receive said arc-traveled sphere and to direct said received sphere toward a second carousal wheel positioned at a second curve of said elliptical path for travel of said sphere through an arc defined by the rotation of said second wheel.

7. The device as claimed in claim 6 wherein said sphere-directing rail comprises a first rail space outwardly from a second rail for containing said sphere there between to direct the path of sphere travel.

8. An improvement in a position control device for a graphical user interface pointing device, the control device of the type having a plurality of spheres in a housing for supporting the spheres in adjacent annular array the housing having a window therein to permit a user to apply lateral force on at least on of the spheres for communication of the force to the plurality of spheres to accomplish lateral movement of the spheres the improvement comprising:

a carousel wheel rotatable about a central axis said wheel having sphere-accepting indents to receive a sphere forced by a user against said wheel orthogonally to said wheel central axis, said indents receiving and communicating said user force from said sphere to said wheel to rotate said wheel about said axis to direct the movement of said indent-received sphere about the arc of a curve defined by the rotation of said wheel on said axis and to deposit said sphere at an opposite end of said arc from where said sphere was received by said indent, an apron extending outwardly from said wheel central axis to support said sphere received by said wheel indent, said apron to receive and support said sphere during the movement of said sphere by said wheel, a sphere-directing rail for defining a generally elliptical path of sphere travel to direct said sphere travel toward a first carousel wheel positioned at a first curve of said elliptical path for travel of said sphere through an arc defined by the rotation of said first wheel and said rail to then receive said arc-traveled sphere and to direct said received sphere toward a second carousal wheel positioned at a second curve of said elliptical path for travel of said sphere through an arc defined by the rotation of said second wheel, and a flexible hub connecting said carousel wheel to said axis, said flexible hub permitting repositioning of said carousel wheel in response to variations in forces on said carousel from the array of spheres.

9. The device as claimed in claim 8 wherein said sphere-directing rail comprises a first rail space outwardly from a second rail for containing said sphere there between to direct the path of sphere travel.

* * * * *

UNITED STATES PATENT AND TRADEMARK OFFICE
CERTIFICATE OF CORRECTION

PATENT NO.    : 5,874,940
DATED         : February 23, 1999
INVENTOR(S)   : David G. Rowe It is certified that error appears in the above-indentified patent and that said Letters Patent is hereby corrected as shown below:

Column 1, line 47, change "or" to --on--.
Column 2, line 61, after "spheres" add --by changing the space available for the array of spheres--.

Column 6, line 19, after the words "end of the," change "are" to --arc--.
Column 7, line 58, after the word "response," change "t o" to --to--.
Column 9, line 56, after the words "18b," remove "=$I$" and remove the italics.
Column 10, line 25, after the words "also being" add --exerted by star--.

Signed and Sealed this

Fourteenth Day of March, 2000

Attest:

Q. TODD DICKINSON

*Attesting Officer*          *Commissioner of Patents and Trademarks*